(12) United States Patent
Kumar et al.

(10) Patent No.: US 6,726,990 B1
(45) Date of Patent: *Apr. 27, 2004

(54) SILICON OXIDE PARTICLES

(75) Inventors: Sujeet Kumar, Fremont, CA (US); Xiangxin Bi, San Ramon, CA (US); Nobuyuki Kambe, Menlo Park, CA (US)

(73) Assignee: NanoGram Corporation, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,514

(22) Filed: May 27, 1998

(51) Int. Cl.[7] ............................. C07C 1/68; B32B 5/16
(52) U.S. Cl. ..................... 428/402; 510/167; 423/325; 51/309
(58) Field of Search .................. 428/357, 372, 428/402; 427/215, 219, 227, 314; 252/521.3; 510/166–176; 423/264, 324, 325, 335; 264/234, 681; 51/307, 308, 309

(56) References Cited

U.S. PATENT DOCUMENTS

| | | |
|---|---|---|
| 3,954,945 A | 5/1976 | Lange et al. |
| 4,011,099 A | 3/1977 | Gutsche .................. 134/7 |
| 4,048,290 A | 9/1977 | Lee |
| 4,356,107 A * | 10/1982 | Payne .................. 252/313 S |
| 4,536,252 A | 8/1985 | McDonald et al. |
| 4,548,798 A * | 10/1985 | Rice .................. 423/263 |
| 4,556,416 A | 12/1985 | Kamijo et al. |
| 4,558,017 A | 12/1985 | Gupta et al. |
| 4,705,762 A | 11/1987 | Ota et al. |
| 4,764,497 A * | 8/1988 | Yuasa et al. .................. 502/235 |
| 4,775,520 A * | 10/1988 | Unger et al. .................. 423/335 |
| 4,842,837 A | 6/1989 | Shimizu et al. .............. 423/335 |
| 4,910,155 A | 3/1990 | Cote et al. |
| 4,956,313 A | 9/1990 | Cote et al. |
| 4,959,113 A * | 9/1990 | Roberts .................. 156/636 |
| 4,983,650 A * | 1/1991 | Sasaki .................. 524/27 |
| 5,062,936 A | 11/1991 | Beaty et al. |
| 5,108,732 A | 4/1992 | Krumbe et al. |
| 5,128,081 A * | 7/1992 | Siegel et al. .................. 264/81 |

(List continued on next page.)

FOREIGN PATENT DOCUMENTS

| | | | |
|---|---|---|---|
| WO | WO 9524054 A | * | 9/1995 |
| WO | WO 9851613 A | * | 11/1998 |

OTHER PUBLICATIONS

Ullmann's Encyclopedia of Industrial Chemistry (ed. Barbara Elvers, vol. A23, pp. 635–639, 1993).*

(List continued on next page.)

*Primary Examiner*—Paul Thibodeau
*Assistant Examiner*—Kevin M. Bernatz
(74) *Attorney, Agent, or Firm*—Patterson, Thuente, Skaar & Christensen, P.A.; Peter S. Dardi

(57) ABSTRACT

A collection of silicon oxide nanoparticles have an average diameter from about 5 nm to about 100 nm. The collection of silicon oxide nanoparticles effectively include no particles with a diameter greater than about four times the average diameter. The particles generally have a spherical morphology. Methods for producing the nanoparticles involve laser pyrolysis. The silicon oxide nanoparticles are effective for the production of improved polishing compositions including compositions useful for chemical-mechanical polishing.

15 Claims, 7 Drawing Sheets

U.S. PATENT DOCUMENTS

| | | | | |
|---|---|---|---|---|
| 5,169,610 A | * | 12/1992 | Yamada et al. | 423/21.1 |
| 5,228,886 A | | 7/1993 | Zipperian | |
| 5,352,277 A | * | 10/1994 | Sasaki | 106/6 |
| 5,480,696 A | * | 1/1996 | Harris et al. | 428/69 |
| 5,527,423 A | | 6/1996 | Neville et al. | |
| 5,580,655 A | * | 12/1996 | El-Shall et al. | 428/402 |
| 5,599,511 A | * | 2/1997 | Helble et al. | 422/232 |
| 5,605,569 A | * | 2/1997 | Boyer et al. | 106/482 |
| 5,626,715 A | * | 5/1997 | Rostoker | 438/4 |
| 5,635,154 A | * | 6/1997 | Arai et al. | 423/592 |
| 5,645,736 A | * | 7/1997 | Allman | 216/89 |
| 5,650,017 A | * | 7/1997 | Gorden et al. | 134/7 |
| 5,770,022 A | * | 6/1998 | Chang et al. | 204/164 |
| 5,801,092 A | * | 9/1998 | Ayers | 438/623 |
| 5,846,310 A | * | 12/1998 | Noguchi et al. | 106/482 |
| 5,871,872 A | * | 2/1999 | Matijevic et al. | 430/7 |
| 5,876,490 A | * | 3/1999 | Ronay | 106/3 |
| 5,876,683 A | * | 3/1999 | Glumac et al. | 423/325 |
| 5,891,205 A | * | 4/1999 | Picardi et al. | 106/3 |

OTHER PUBLICATIONS

"Synthesis of Ultafine $Si^3N_4$ Particles by $CO_2$–Laser Induced Gas Phase Reactions" Peter R. Buerki et al. High Temperature Science, vol. 27 pp. 323–335 (1990).

"Material Synthesis by Laser Heating of Gases", G.M. Rice et al. Spectrocimica Acta. vol. 43A. No. 2 pp. 299–300 (1987).

"Synthesis of Ultrafine Ceramic Powders by Means of $CO_2$ laser in a flow reactor", R. Fantoni et al. SPIE vol. 1279 Laser–Asserted Processing, pp. 77–89 (1990).

"Sinterable Powders from Laser–Divison Reactions", J.S. Hagerty et al. in Laser–Induced Chemical Processes, ed. by Jeffrey I. Steinfeld. Plenum Press, pp. 165–241 (1981).

"Ceramic Powders from Laser Driven Reactions", John H. Flint et al. SPIE vol. 458 Applications of Lasers to Industrial Chemistry, pp. 108–113 (1984).

"Laser Synthesis of Vanadium–titanium Oxide Catalysts", M. Musci. J. Mater. Res., vol. 7, No. 10. pp. 2846–2852 (Oct. 1992).

"Infrared Laer Generation of Heterogeneous Catalysts and Laser–induced Reactions at Catalytic Surfaces", Wayne C. Danen. SPIE vol. 458 Applications of Lasers to Industrial Chemistry, pp. 124–130 (1984).

"Sinterable Ceramic Powders from Laser–Driven Reactions: II, Powder Characteristics and Process Variables", W.R. Cannon et al. Journal of the American Ceramic Society vol. 65, No. 7 pp. 330–335 (Jul. 1982).

"Sinterable Ceramic Powders from Laser–Driven Reactions: I, Process Description and Modeling", W.R. Cannon et al. Journal of the American Ceramic Society vol. 65, No. 7 pp. 324–330 (Jul. 1982).

* cited by examiner

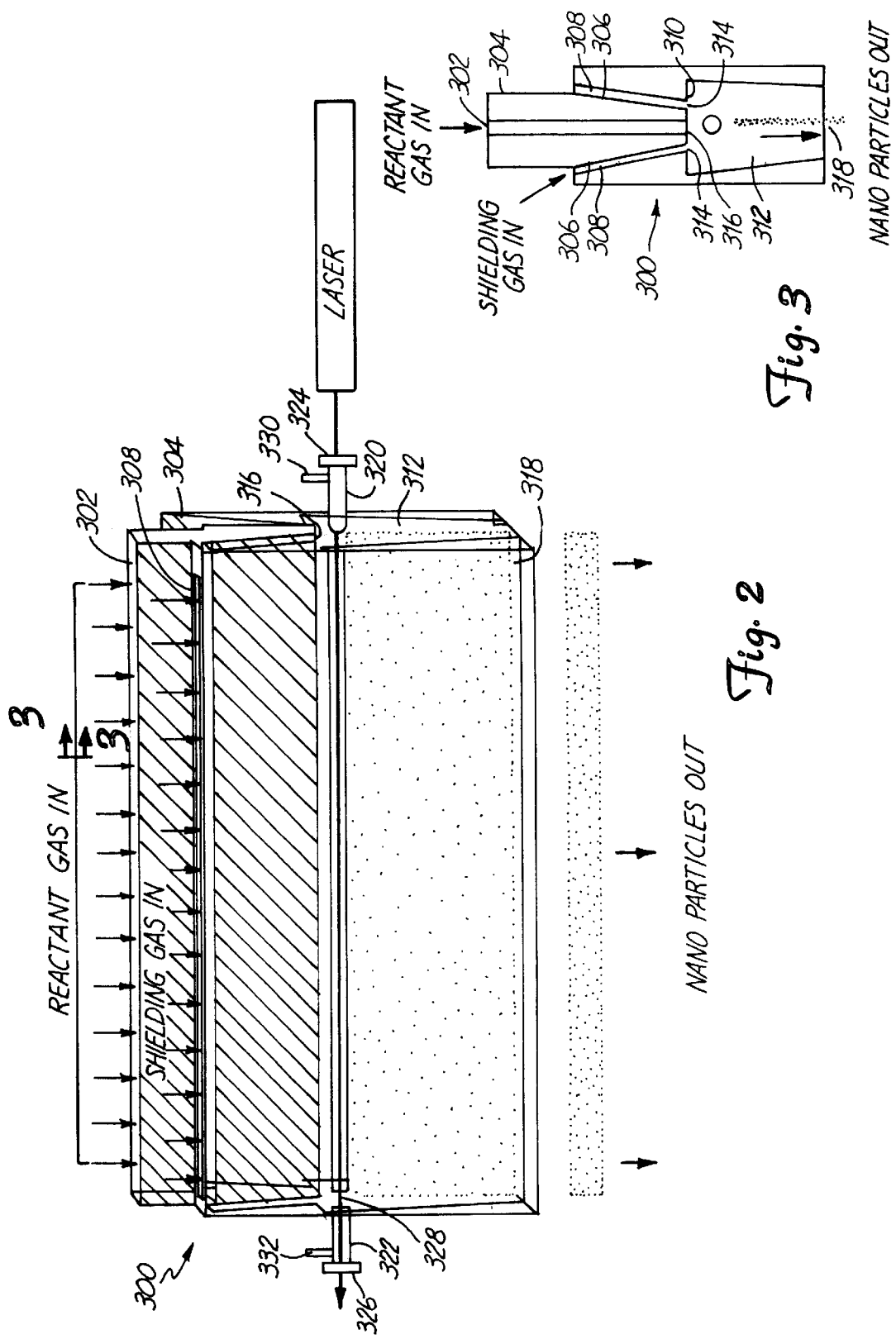

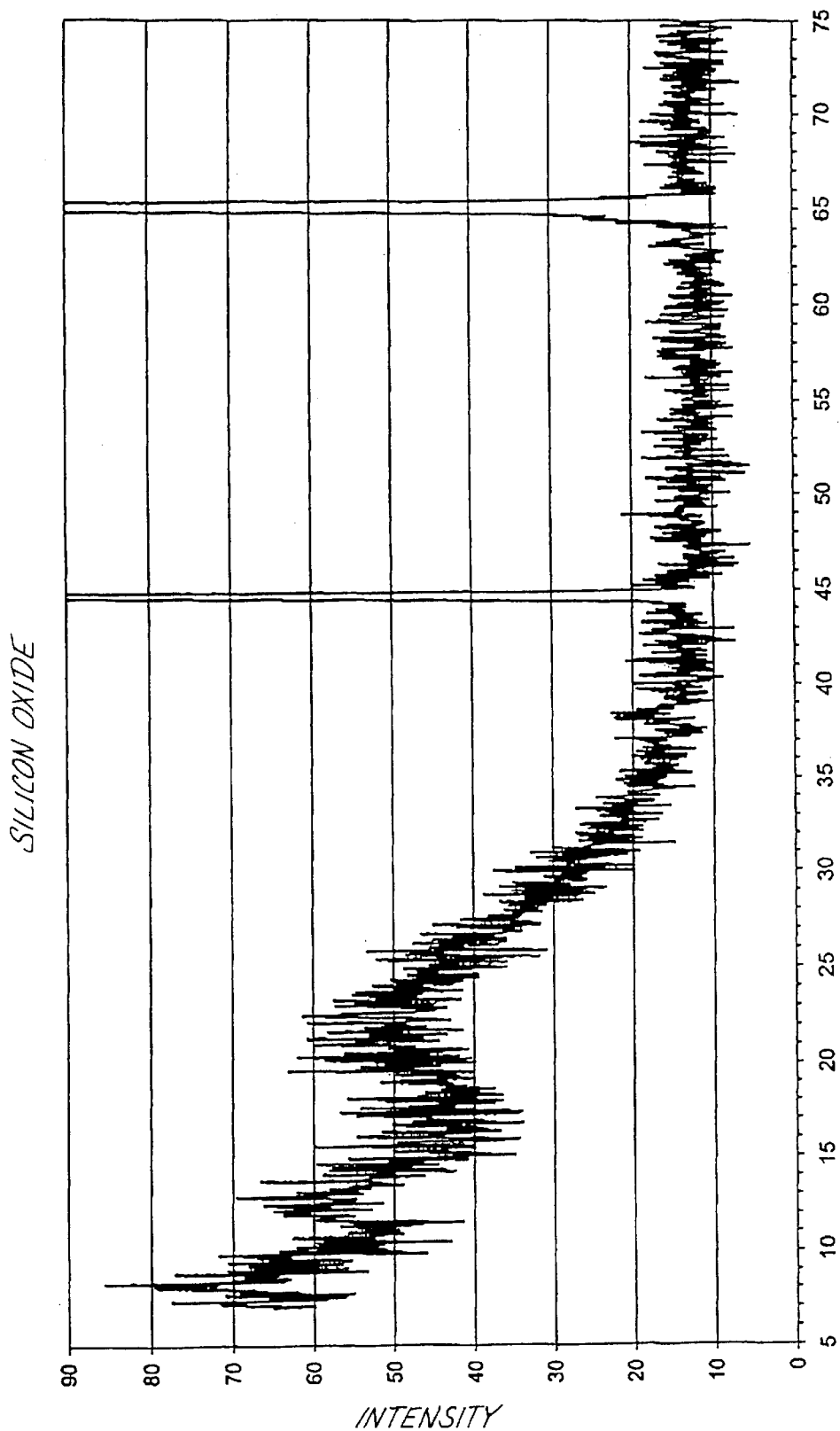

SILICON OXIDE PARTICLES

FIELD OF THE INVENTION

The invention relates to silicon oxide particles having small particle diameters. The method further relates to method of producing the silicon oxide particles based on laser pyrolysis and polishing compositions including the silicon oxide particles.

BACKGROUND OF THE INVENTION

Technological advances have increased the demand for improved material processing with strict tolerances on processing parameters. In particular, smooth surfaces are required in a variety of applications in electronics, tool production and many other industries. The substrates requiring polishing can involve hard materials such as ceramics, glass and metal. As miniaturization continues even further, even more precise polishing will be required. Current submicron technology requires polishing accuracy on a nanometer scale. Precise polishing technology can employ mechanochemical polishing involving a polishing composition that acts by way of a chemical interaction of the substrate with the polishing agents as well as an abrasive effective for mechanical smoothing of the surface.

SUMMARY OF THE INVENTION

The invention features a collection of particles comprising amorphous silicon oxide having primary particles with an average diameter from about 5 nm to about 100 nm. The collection of silicon oxide particles effectively include no particles having a diameter greater than about four times the average diameter. In another aspect, the invention features a polishing composition including a dispersion of silicon oxide particles having an average primary particle diameter from about 5 nm to about 100 nm. The collection of silicon oxide particles in the dispersion effective includes no primary particles having a diameter greater than about four times the average diameter.

In another aspect, the invention features a method for processing a collection of silicon oxide particles having an average diameter from about 5 nm to about 1000 nm. The method includes heating the collection of particles comprising silicon oxide at a temperature from about 400° C. to about 800° C. In another aspect, the invention features a collection of particles comprising silicon oxide, the collection of particles having an average diameter from about 5 nm to about 1000 nm, the collection of particles being produced by forming particles comprising silicon oxide by laser pyrolysis and heating the particles produced by laser pyrolysis under an oxidizing atmosphere at a temperature from about 400° C. to about 800° C. for a sufficient period of time to decolorize the particles.

BRIEF DESCRIPTION OF THE DRAWINGS

FIG. 2 is a schematic, perspective view of a reaction chamber of an alternative embodiment of the laser pyrolysis apparatus, where the materials of the chamber are depicted as transparent to reveal the interior of the apparatus.

FIG. 3 is a sectional view of the reaction chamber of FIG. 2 taken along line 3—3.

FIG. 8 is an x-ray diffractogram of nanoparticles of silicon oxide following heating in an oven.

DETAILED DESCRIPTION OF THE PREFERRED EMBODIMENTS

Figure 1:
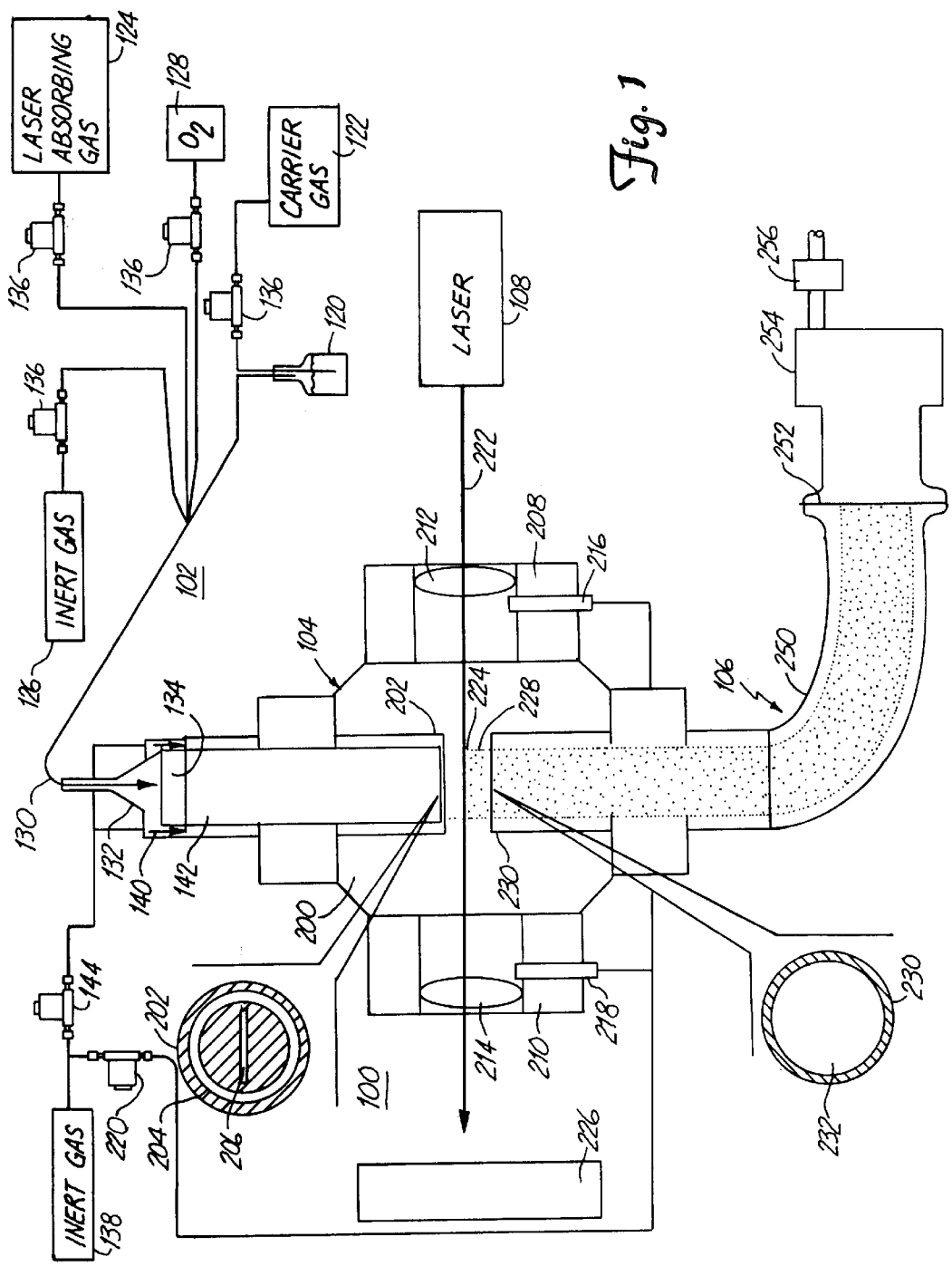
FIG. 1 is a schematic, sectional view of an embodiment of a laser pyrolysis apparatus taken through the middle of the laser radiation path. The upper insert is a bottom view of the injection nozzle, and the lower insert is a top view of the collection nozzle.

Amorphous silicon oxide particles have been produced having primary particles with extremely small average diameters and a very narrow particle size distribution. Furthermore, the particle size distribution effectively does not have a tail so that there are no primary particles with diameters significantly larger than the average. The particles have a spherical morphology generally lacking any sharp edges or appendages that can result from other processing approaches.

Due to their extremely high uniformity in size and shape, these nanoscale silicon oxide particles can be used to form improved abrasive compositions. Abrasive compositions incorporating these particles are useful for polishing surfaces that have restrictive tolerance requirements with respect to smoothness. The small diameter of the particles along with the extremely high degree of uniformity of the particles make them particularly desirable for formulating abrasive or polishing compositions for mechanochemical polishing.

To generate the desired nanoparticles, laser pyrolysis is used either alone or in combination with additional processing. Specifically, laser pyrolysis is an excellent process for efficiently producing suitable amorphous silicon dioxide particles with a narrow distribution of average particle diameters. In addition, nanoscale silicon oxide particles produced by laser pyrolysis can be subjected to heating in an oxygen environment or an inert environment to alter and/or improve the properties of the particles.

A basic feature of successful application of laser pyrolysis for the production of silicon oxide nanoparticles is the generation of a molecular stream containing a silicon precursor compound, a radiation absorber and a reactant serving as an oxygen source. The molecular stream is pyrolyzed by an intense laser beam. As the molecular stream leaves the laser beam, the particles are rapidly quenched.

The silicon oxides particles have a stoichiometry of $SiO_x$, where $1 \leq x \leq 2$. The silicon oxide particles are amorphous as determined by x-ray diffraction studies.

A. Particle Production

Laser pyrolysis has been discovered to be a valuable tool for the production of nanoscale silicon oxides particles. In addition, the particles produced by laser pyrolysis are a convenient material for further processing to expand the pathways for the production of desirable silicon oxide particles. Thus, using laser pyrolysis alone or in combination with additional processes, a wide variety of silicon oxide particles can be produced.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce silicon oxide particles in a particular apparatus are described below in the Examples. Furthermore, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant gas flow rate and velocity of the reactant gas stream are inversely related to particle size so that increasing the reactant gas flow rate or velocity tends to result in smaller particle size. Also, the growth dynamics of the particles have a significant influence on the size of the resulting particles. In other words, different forms of a product compound have a tendency to form different size particles from other phases under relatively similar conditions. Laser power also influences particle size with increased laser power favoring larger particle formation for lower melting materials and smaller particle formation for higher melting materials.

Appropriate silicon precursor compounds generally include silicon compounds with reasonable vapor pressures, i.e., vapor pressures sufficient to get desired amounts of precursor vapor in the reactant stream. The vessel holding the precursor compounds can be heated to increase the vapor pressure of the silicon compound precursor, if desired. Preferred silicon precursors include, for example, silicon tetrachloride ($SiCl_4$), trichlorosilane ($Cl_3HSi$), trichloromethyl silane $CH_3SiCl_3$, and tetraethoxysilane ($Si(OC_2H_5)_4$, also known as ethyl silane and tetraethyl silane).

Preferred reactants serving as oxygen source include, for example, $O_2$, CO, $CO_2$, $O_3$ and mixtures thereof. The reactant compound from the oxygen source should not react significantly with the silicon precursor prior to entering the reaction zone since this generally would result in the formation of large particles.

Laser pyrolysis can be performed with a variety of optical laser frequencies. Preferred lasers operate in the infrared portion of the electromagnetic spectrum. $CO_2$ lasers are particularly preferred sources of laser light. Infrared absorbers for inclusion in the molecular stream include, for example, $C_2H_4$, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the radiation beam increases the temperature at a tremendous rate, many times the rate that energy generally would be produced even by strongly exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. Appropriate shielding gases include, for example, Ar, He and $N_2$.

An appropriate laser pyrolysis apparatus generally includes a reaction chamber isolated from the ambient environment. A reactant inlet connected to a reactant supply system produces a molecular stream through the reaction chamber. A laser beam path intersects the molecular stream at a reaction zone. The molecular stream continues after the reaction zone to an outlet, where the molecular stream exits the reaction chamber and passes into a collection system. Generally, the laser is located external to the reaction chamber, and the laser beam enters the reaction chamber through an appropriate window.

Referring to FIG. 1, a particular embodiment 100 of a pyrolysis apparatus involves a reactant supply system 102, reaction chamber 104, collection system 106 and laser 108. Reactant supply system 102 includes a source 120 of precursor compound. For liquid precursors, a carrier gas from carrier gas source 122 can be introduced into precursor source 120, containing liquid precursor to facilitate delivery of the precursor. The carrier gas from source 122 preferably is either an infrared absorber or an inert gas and is preferably bubbled through the liquid, precursor compound. The quantity of precursor vapor in the reaction zone is roughly proportional to the flow rate of the carrier gas.

Alternatively, carrier gas can be supplied directly from infrared absorber source 124 or inert gas source 126, as appropriate. The reactant providing the oxygen is supplied from reactant source 128, which can be a gas cylinder or other suitable container. The gases from the precursor source 120 are mixed with gases from reactant source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104. The combined gas in tube 130 passes through a duct 132 into rectangular channel 134, which forms part of an injection nozzle for directing reactants into the reaction chamber.

Flow from sources 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, Model 825 series, from Edwards High Vacuum International, Wilmington, Mass.

Inert gas source 138 is connected to an inert gas duct 140, which flows into annular channel 142. A mass flow controller 144 regulates the flow of inert gas into inert gas duct 140. Inert gas source 126 can also function as the inert gas source for duct 140, if desired.

The reaction chamber 104 includes a main chamber 200. Reactant supply system 102 connects to the main chamber 200 at injection nozzle 202. The end of injection nozzle 202 has an annular opening 204 for the passage of inert shielding gas, and a rectangular slit 206 for the passage of reactant gases to form a molecular stream in the reaction chamber. Annular opening 204 has, for example, a diameter of about 1.5 inches and a width along the radial direction from about 1/8 in to about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably cylindrical lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J.

Reactants passing through slit 206 in injection nozzle 202 initiate a molecular stream. The molecular stream passes through reaction zone 224, where reaction involving the silicon precursor compound takes place. Heating of the gases in reaction zone 224 is extremely rapid, roughly on the order of $10^5$ degree C/sec depending on the specific conditions. The reaction is rapidly quenched upon leaving reaction zone 224, and particles 228 are formed in the molecular stream. The nonequilibrium nature of the process allows for the production of nanoparticles with a highly uniform size distribution and structural homogeneity.

The path of the molecular stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The preferred chamber pressure for the production of the desired oxides generally ranges from about 80 Torr to about 500 Torr.

Reaction chamber 104 has two additional tubular sections not shown. One of the additional tubular sections projects into the plane of the sectional view in FIG. 1, and the second additional tubular section projects out of the plane of the sectional view in FIG. 1. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection system 106 can include a curved channel 250 leading from collection nozzle 230. Because of the small size of the particles, the product particles follow the flow of the gas around curves. Collection system 106 includes a filter 252 within the gas flow to collect the product particles. A variety of materials such as Teflon, glass fibers and the like can be used for the filter as long as the material is inert and has a fine enough mesh to trap the particles. Preferred materials for the filter include, for example, a glass fiber filter from ACE Glass Inc., Vineland, N.J. and cylindrical polypropylene filters from Cole-Parmer Instrument Co., Vernon Hills, Ill.

Pump 254 is used to maintain collection system 106 at a selected pressure. A variety of different pumps can be used. Appropriate pumps for use as pump 254 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 256 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 254 and filter 252. As the chamber pressure increases due to the accumulation of particles on filter 252, the manual valve or the throttle valve can be adjusted to maintain the pumping rate and the corresponding chamber pressure.

The reaction can be continued until sufficient particles are collected on filter 252 such that the pump can no longer maintain the desired pressure in the reaction chamber 104 against the resistance through filter 252. When the pressure in reaction chamber 104 can no longer be maintained at the desired value, the reaction is stopped, and the filter 252 is removed. With this embodiment, about 1–90 grams of particles can be collected in a single run before the chamber pressure can no longer be maintained. A single run generally can last up to about 6 hours depending on the type of particle being produced and the type of filter being used. Therefore, it is straightforward to produce a macroscopic quantity of particles, i.e., a quantity visible with the naked eye.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the bottom of the reaction chamber, and the product particles are collected from the top of the chamber. This alternative configuration can result in a slightly higher collection of product since silicon oxide particles tend to be buoyant in the surrounding gases. In this configuration, it is preferable to include a curved section in the collection system so that the collection filter is not mounted directly above the reaction chamber.

An alternative design of a laser pyrolysis apparatus has been described. See, U.S. Pat. No. 5,958,348, entitled "Efficient Production of Particles by Chemical Reaction," incorporated herein by reference. This alternative design is intended to facilitate production of commercial quantities of particles by laser pyrolysis. A variety of configurations are described for injecting the reactant materials into the reaction chamber.

The alternative apparatus includes a reaction chamber designed to minimize contamination of the walls of the chamber with particles, to increase the production capacity and to make efficient use of resources. To accomplish these objectives, the reaction chamber conforms generally to the shape of an elongated reactant inlet, decreasing the dead volume outside of the molecular stream. Gases can accumulate in the dead volume, increasing the amount of wasted radiation through scattering or absorption by nonreacting molecules. Also, due to reduced gas flow in the dead volume, particles can accumulate in the dead volume causing chamber contamination.

The design of the improved reaction chamber 300 is schematically shown in FIGS. 2 and 3. A reactant gas channel 302 is located within block 304. Facets 306 of block 304 form a portion of conduits 308. Another portion of conduits 308 join at edge 310 with an inner surface of main chamber 312. Conduits 308 terminate at shielding gas inlets 314. Block 304 can be repositioned or replaced, depending on the reaction and desired conditions, to vary the relationship between the elongated reactant inlet 316 and shielding gas inlets 314. The shielding gases from shielding gas inlets 314 form blankets around the molecular stream originating from reactant inlet 316.

The dimensions of elongated reactant inlet 316 preferably are designed for high efficiency particle production. Reasonable dimensions for the reactant inlet for the production of the silicon oxide particles, when used with a 1800 watt $CO_2$ laser, are from about 5 mm to about 1 meter.

Main chamber 312 conforms generally to the shape of elongated reactant inlet 316. Main chamber 312 includes an outlet 318 along the molecular stream for removal of particulate products, any unreacted gases and inert gases. Tubular sections 320, 322 extend from the main chamber 312. Tubular sections 320, 322 hold windows 324, 326 to define a laser beam path 328 through the reaction chamber 300. Tubular sections 320, 322 can include shielding gas inlets 330, 332 for the introduction of shielding gas into tubular sections 320, 322.

The improved apparatus includes a collection system to remove the particles from the molecular stream. The collection system can be designed to collect a large quantity of particles without terminating production or, preferably, to run in continuous production by switching between different particle collectors within the collection system. The collection system can include curved components within the flow path similar to curved portion of the collection system shown in FIG. 1. The configuration of the reactant injection components and the collection system can be reversed such that the particles are collected at the top of the apparatus.

As noted above, properties of the product particles can be modified by further processing. In particular, silicon oxide nanoscale particles can be heated in an oven in an oxidizing environment or an inert environment to alter the oxygen content or possibly to remove adsorbed compounds on the particles to improve the quality of the particles.

The use of sufficiently mild conditions, i.e., temperatures well below the melting point of the particles, results in modification of the silicon oxide particles without significantly sintering the particles into larger particles. The processing of metal oxide nanoscale particles in an oven is discussed in U.S. Pat. No. 5,989,514, filed Jul. 21, 1997, entitled "Processing of Vanadium Oxide Particles With Heat," incorporated herein by reference.

Figure 4:
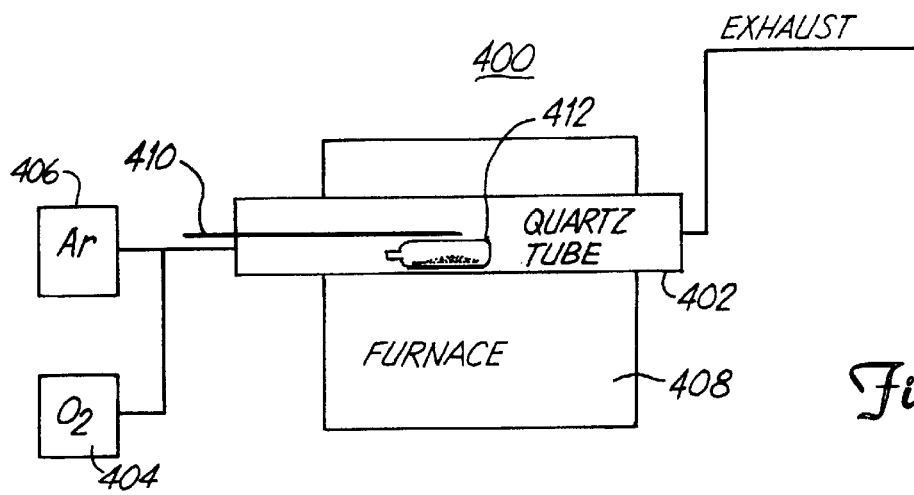
FIG. 4 is a schematic, sectional view of an oven for heating nanoparticle, in which the section is taken through the center of the quartz tube.

A variety of apparatuses can be used to perform the heat processing. An example of an apparatus 400 to perform this processing is displayed in FIG. 4. Apparatus 400 includes a tube 402 into which the particles are placed. Tube 402 is connected to a reactant gas source 404 and inert gas source 406. Reactant gas, inert gas or a combination thereof are placed within tube 402 to produce the desired atmosphere.

Preferably, the desired gases are flowed through tube 402. Appropriate reactant gases to produce an oxidizing environment include, for example, $O_2$, $O_3$, CO, $CO_2$ and combinations thereof. The reactant gas can be diluted with inert gases such as Ar, He and $N_2$. The gases in tube 402 can be exclusively inert gases if an inert atmosphere is desired. The reactant gases may not result in changes to the stoichiometry of the particles being heated.

Tube 402 is located within oven or furnace 408. Oven 408 maintains the relevant portions of the tube at a relatively constant temperature, although the temperature can be varied systematically through the processing step, if desired. Temperature in oven 408 generally is measured with a thermocouple 410. The silicon oxide particles can be placed in tube 402 within a vial 412. Vial 412 prevents loss of the particles due to gas flow. Vial 412 generally is oriented with the open end directed toward the direction of the source of the gas flow.

The precise conditions including type of oxidizing gas (if any), concentration of oxidizing gas, pressure or flow rate of gas, temperature and processing time can be selected to produce the desired type of product material. The temperatures generally are mild, i.e., significantly below the melting point of the material. The use of mild conditions avoids interparticle sintering resulting in larger particle sizes. Some controlled sintering of the particles can be performed in oven 408 at somewhat higher temperatures to produce slightly larger, average particle diameters.

For the processing of silicon oxide, for example, the temperatures preferably range from about 50° C. to about 800° C. The particles preferably are heated for about 1 hour to about 100 hours. Some empirical adjustment may be required to produce the conditions appropriate for yielding a desired material.

With respect to one particular modification of silicon oxide particles, it has been found that heating can be used to decolorize silicon oxide produced by laser pyrolysis. Upon decolorization, the particles are changed from dark to white. The decolorization likely involves either the removal of associated carbon or an alteration of the amount of oxygen in the particles. For the decolorizing process, the temperature preferably ranges from about 400° C. to about 800° C. The heating time for decolorization can be empirically adjusted and generally is greater than about 1 hour.

B. Particle Properties

A collection of particles of interest generally has an average diameter for the primary particles of less than a micron, preferably from about 5 nm to about 100 nm, more preferably from about 5 nm to about 25 nm. The primary particles usually have a roughly spherical gross appearance with few if any sharp appendages. Generally, 95 percent of the primary particles, and preferably 99 percent, have ratios of the dimension along the major axis to the dimension along the minor axis less than about 2. Diameter measurements on particles with asymmetries are based on an average of length measurements along the principle axes of the particle.

Because of their small size, the primary particles tend to form loose agglomerates due to van der Waals and other electromagnetic forces between nearby particles. Nevertheless, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, $TiO_2$ nanoparticles generally exhibit altered absorption properties based on their small size, as described in U.S. Pat. No. 6,099,798, entitled "Ultraviolet Light Block and Photocatalytic Materials," incorporated herein by reference.

The primary particles preferably have a high degree of uniformity in size. As determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent of the primary particles have a diameter greater than about 60 percent of the average diameter and less than about 140 percent of the average diameter.

Furthermore, essentially no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail indicates that there are less than about 1 particle in $10^6$ have a diameter greater than a particular cut off value above the average diameter. The narrow size distributions, lack of a tail in the distributions and the spherical morphology can be exploited in a variety of applications, as described below.

While the silicon oxide particles described herein are amorphous, they generally are uniform in composition, size and shape. A high degree of uniformity is a characteristic of laser pyrolysis generally. The particles following proper heat treatment can have a purity of at least about 99.9 percent by weight silicon oxide and more preferably 99.99 percent by weight silicon oxide.

C. Polishing Compositions

A variety of polishing compositions can advantageously incorporate nanoscale silicon oxide particles, including compositions for performing chemical-mechanical polishing. The silicon oxide particles can function as abrasive particles or in the formation of colloidal silica, which can have both a chemical and/or a mechanical effect on various substrates. In its simplest form, the polishing composition can just involve the abrasive, silicon oxide particles, produced as described above. More preferably, the abrasive particles are dispersed in an aqueous or nonaqueous solution. The solution generally includes a solvent such as water, alcohol, acetone or the like. A surfactant can be added to add with dispersion, if desired. The abrasive particles should not be significantly soluble in the solvent. The polishing composition generally includes from about 0.05 percent to about 50 percent, and preferably from about 1.0 percent to about 20 percent by weight silicon oxide particles.

The formation of colloidal silica involves formation of an aqueous solution of hydrated silicon oxides. The use of colloidal silica for polishing hard substrates is described in U.S. Pat. No. 5,228,886, "Mechanochemical Polishing Abrasive," incorporated herein by reference, and in U.S. Pat. No. 4,011,099, entitled "Preparation of Damage-Free Surface on Alpha-Alumina," incorporated herein by reference. Colloidal silica has been suggested to chemically react with certain surfaces. Silica particles produced by laser pyrolysis with or without additional heating are ideally suited for the production of colloidal silica due to all of the properties described above.

The solvents used in the formation of the polishing compositions preferably have a low level of contaminants. In particular, water used as a solvent should be deionized and/or distilled. The polishing composition preferably is free from any contaminants, i.e., any composition not included for effectuating the polishing process. In particular, the polishing composition should be free of metal contaminants such as potassium and sodium. Preferably, the compositions contain less than about 0.001 percent and more preferably, less than about 0.0001 percent by weight metal. The polishing composition should be free from particulate contaminants, which are not soluble in the solvent.

The polishing compositions can include other components to assist with the polishing process. For example, the polishing composition can include a slurry of colloidal silica combined with additional (non-silicon oxide) abrasive particles. Suitable abrasive particles are described, for example, in copending and commonly assigned U.S. patent application Ser. No. 08/961,735, now U.S. Pat. No. 6,290,735, entitled "Abrasive Particles for Surface Polishing," incorporated herein by reference, and in U.S. Pat. No. 5,228,886, supra. When using colloidal silica along with additional (non-silicon oxide) abrasive particles, the polishing composition preferably includes from about 0.05 to about 5 percent abrasive particles.

Preferred abrasive particles include silicon carbide, metal oxides, metal sulfides and metal carbides with average diameters less than about 100 nm and more preferably from about 5 nm to about 50 nm. Preferred abrasive particles include compounds such as SiC, $Al_2O_3$, $TiO_2$, $Fe_2O_3$, $Fe_3O_4$, $Fe_3C$, $Fe_7C_3$, $MoS_2$, $MoO_2$, WC, $WO_3$, and $WS_2$. Also, preferred abrasive particles have a relatively narrow diameter distribution and an effective cut of particle diameters that are several times larger than the average diameter. The particular composition of abrasive particles should be selected such that the particles have an appropriate hardness for the surface to be polished as well as an appropriate distribution of diameters to obtain efficiently the desired smoothness. Abrasive particles that are too hard can result in undesired scratches in the surface while particles that are too soft may not be suitably abrasive.

The polishing composition can be acidic or basic to improve the polishing characteristics. For polishing metals an acidic pH generally is preferred, for example, in the range from about 3.0 to about 3.5. A variety of acids can be used such as glacial acetic acid. For polishing oxide surfaces a basic polishing composition can be used, for example, with a pH from about 10.5 to about 11. To form a basic polishing composition, KOH or other bases can be added. Also, an oxidizing agent such as $H_2O_2$ can be added, especially for polishing metals.

The composition of the abrasive particles should also provide for removal of the polishing compositions after completion of the polishing. One approach to cleaning polished surfaces involves dissolving the abrasive particles with a cleaning solution that does not damage the polished surface.

The polishing compositions can be used for mechanical or mechanochemical polishing that is performed manually or using a powered polishing machine. In either case, the polishing composition is generally applied to a polishing pad or cloth to perform the polishing. Any of a variety of mechanical polishers can be used, for example, vibratory polishers and rotary polishers.

The polishing compositions are particularly useful for the polishing of substrate surfaces for the production of integrated circuits. As the density of integrated circuits on a single surface increases, the tolerances for smoothness of the corresponding substrates become more stringent. Therefore, it is important that polishing process is able to remove small surface discontinuities prior to applying circuit patterns onto the substrate. The small size and uniformity of the abrasive particles disclosed herein are particularly suitable in polishing compositions for these applications. $SiO_2$ particles are suitable for the polishing of silicon based semiconductor substrates. Similarly, layered structures involving patterned portions of insulating layers and conducting layers can be simultaneously planarized, as described in U.S. Pat. No. 4,956,313, incorporated herein by reference.

EXAMPLES

Example 1
Laser Pyrolysis for Formation of Amorphous $SiO_x$

The synthesis of silicon oxide particles described in this example was performed by laser pyrolysis. The particles were produced using essentially the laser pyrolysis apparatus of FIG. 1, described above.

The silicon tetrachloride (Strem Chemical, Inc., Newburyport, Mass.) precursor vapor was carried into the reaction chamber by bubbling Ar gas through $SiCl_4$ liquid in a container at room temperature. $C_2H_4$ gas was used as a laser absorbing gas, and Argon was used as an inert gas. The reaction gas mixture containing $SiCl_4$, Ar, $O_2$ and $C_2H_4$ was introduced into the reactant gas nozzle for injection into the reaction chamber. The reactant gas nozzle had an opening with dimensions as specified in the last row of Table 1. Additional parameters of the laser pyrolysis synthesis relating to the particles of Example 1 also are specified in Table 1.

TABLE 1

| Sample | 1 | 2 | 3 | 4 |
|---|---|---|---|---|
| Crystal Structure | Amorphous | Amorphous | Amorphous | Amorphous |
| Pressure (Torr) | 210 | 180 | 360 | 240 |
| Argon - Win. (sccm) | 700 | 700 | 700 | 700 |
| Argon - Sld. (slm) | 5.6 | 7.0 | 2.0 | 5.6 |
| Argon - Dil. (sccm) | 1120 | 0.0 | 0.0 | 0.0 |
| Ethylene (sccm) | 1340 | 980 | 670 | 603 |
| Carrier Gas (sccm) | 162 (Ar) | 196 (Ar) | 224 (Ar) | 224 (Ar) |
| Oxygen (sccm) | 840 | 636 | 308 | 412 |
| Laser Output (watts) | 830 | 620 | 520 | 236 |
| Nozzle Size | 5/8 in × 1/8 in | 5/8 in × 1/8 in | 5/8 in × 1/8 in | 5/8 in × 1/8 in | sccm = standard cubic centimeters per minute
slm = standard liters per minute
Argon - Win. = argon flow through inlets 216, 218
Argon - Sld. = argon flow through annular channel 142
Argon - Dil. = additional argon added to the reaction stream besides the argon carrier gas.

The use of additional argon gas to dilute the reaction stream resulted in production of particles that were less agglomerated.

Figure 5:
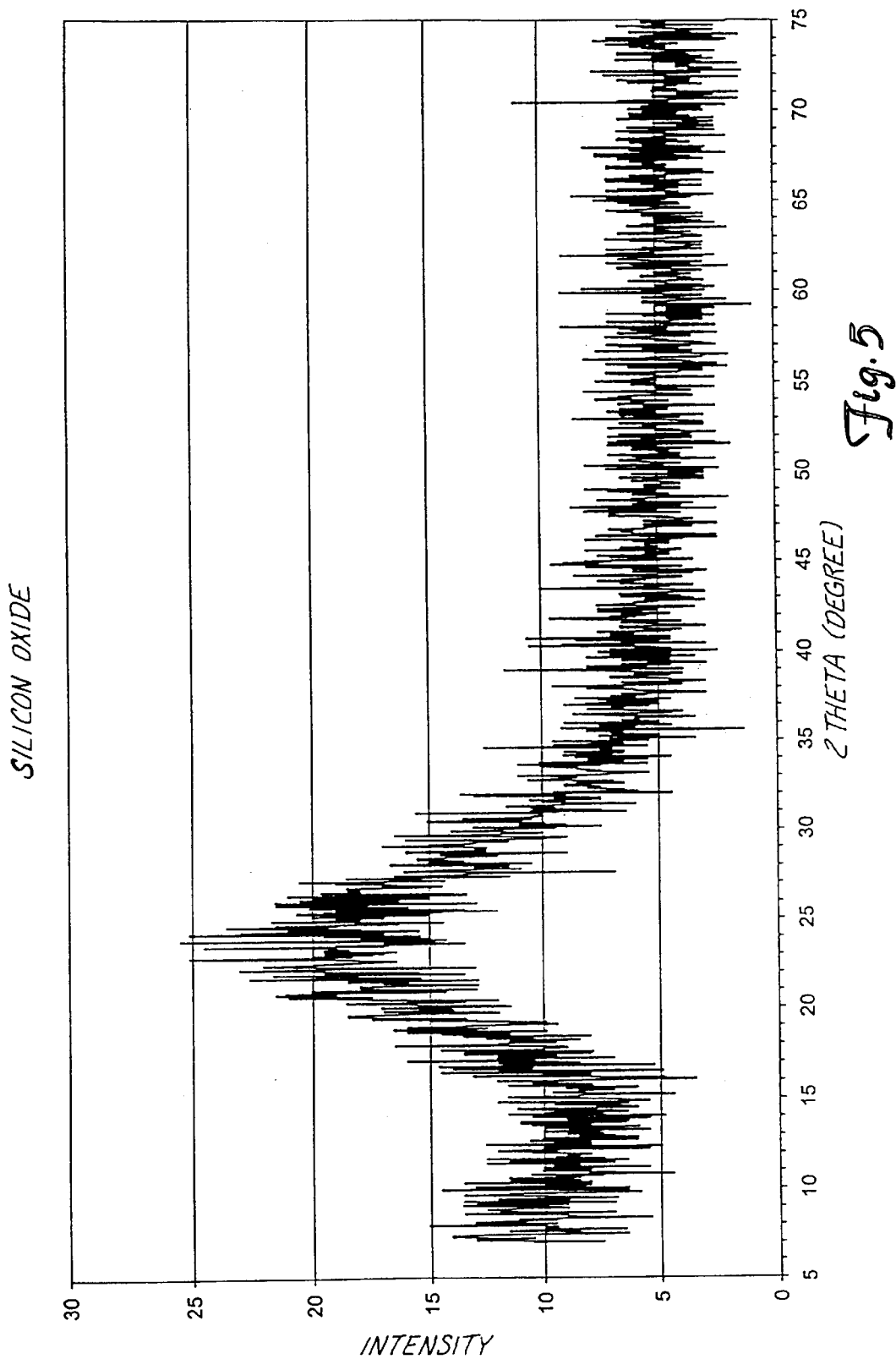
FIG. 5 is an x-ray diffractogram of silicon oxide nanoparticles of Example 1.

The production rate of silicon oxide particles was typically about 30 g/hr. Under the four sets of conditions specified in Table 1, amorphous silicon oxide particles were produced. To evaluate the atomic arrangement, the samples were examined by x-ray diffraction using the $Cu(K\alpha)$ radiation line on a Siemens D500 x-ray diffractometer. An x-ray diffractogram for a sample produced under the conditions specified in the first column of Table 1 is shown in FIG. 5. The broad peak in FIG. 5 is indicative of an amorphous sample. The other samples yielded comparable x-ray diffraction peaks.

Figure 7:
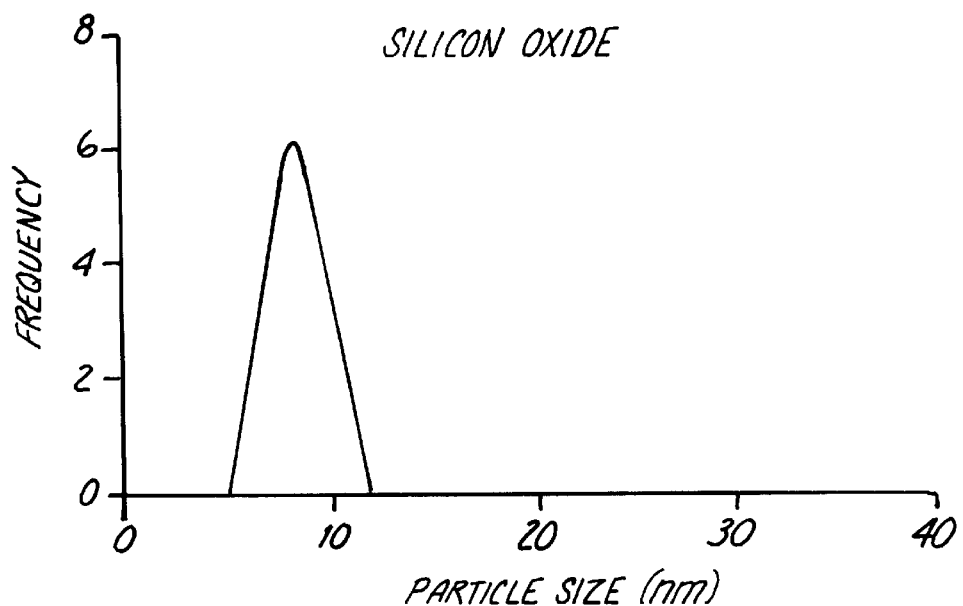
FIG. 7 is a plot of the distribution of primary particle diameters for the nanoparticles shown in the TEM micrograph of FIG. 6.
Figure 6:
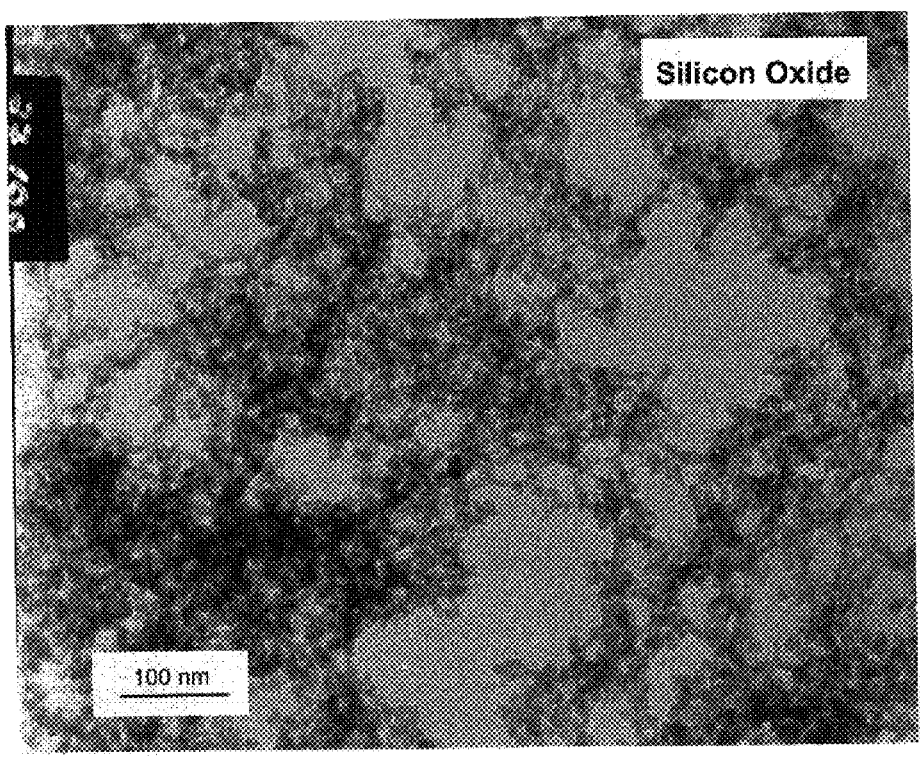
FIG. 6 is a TEM micrograph of nanoparticles whose x-ray diffractogram is shown of FIG. 5.

Transmission electron microscopy (TEM) was used to determine particle sizes and morphology. A TEM micrograph for the particles produced under the conditions of the first column of Table 1 is displayed in FIG. 6. An examination of a portion of the TEM micrograph yielded an average particle size of about 7 nm. The corresponding particle size distribution is shown in FIG. 7. The approximate size distribution was determined by manually measuring diameters of the particles distinctly visible in the micrograph of FIG. 6. Only those particles having clear particle boundaries were measured to avoid regions distorted or out of focus in the micrograph. Measurements so obtained should be more accurate and are not biased since a single view cannot show a clear view of all particles. It is significant that the particles span a rather narrow range of sizes.

For particles produced under the conditions specified in the fourth column of Table 1, the BET surface area was determined to be 264 $m^2$/gram with an $N_2$ gas absorbate. The BET surface area was measured by Particle Technology Labs., Ltd., Downers Grove, Ill.

The stoichiometry of the particles was not determined directly. The particles had a dark color upon visual inspection. The darkness may have been the result of oxygen deficiencies relative to silicon dioxide or to deposits on the particles of elemental carbon from the ethylene in the reactant stream. The dark color was eliminated upon heating in an oxygen environment in an oven as described in the following example.

Example 2
Oven Processed

A sample of silicon oxide nanoparticles produced by laser pyrolysis according to the conditions specified in the fourth column of Table 1 were heated in an oven under oxidizing conditions. The oven was essentially as described above with respect to FIG. 4. The samples were heated in the oven at about 500° C. for about 2 hours. Oxygen gas was flowed through a 1.0 in diameter quartz tube at a flow rate of about 150 sccm. Between about 100 and about 300 mg of nanoparticles were placed in an open 1 cc vial within the quartz tube projecting through the oven. The resulting particles were white particles. The x-ray diffractogram is shown in FIG. 8. The sharp peaks at about 45° and about 65° are due to the aluminum sample holder. The peak at about 7° is an artifact of the instrument. An additional peak appears at about 12° indicative of a second amorphous phase of silicon oxide. Based on the color of the heated particles, the heating process evidently either removed elemental carbon associated with the particles or added oxygen to the particles to shift the stoichiometry toward $SiO_2$.

Figure 9:
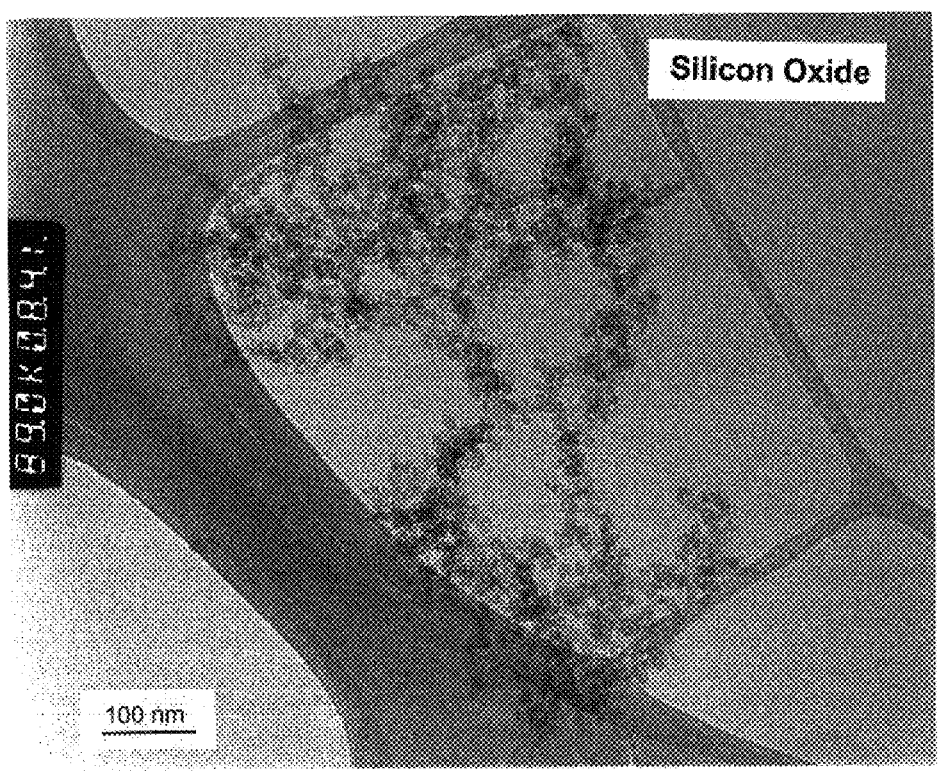
FIG. 9 is a TEM micrograph of silicon oxide nanoparticles following heat treatment in an oven.

A TEM micrograph for the particles is shown in FIG. 9. From an analysis of the TEM micrograph, the average particle diameter is about 10 nm. While it was not determined if the particle diameters were altered by the heat treatment, it is unlikely that significant particle growth, if any, took place since the heat treated particles had a small average diameter.

The embodiments described above are intended to be representative and not limiting. Additional embodiments of the invention are within the claims. Although the present invention has been described with reference to preferred embodiments, workers skilled in the art will recognize that changes may be made in form and detail without departing from the spirit and scope of the invention.

What is claimed is:

1. A collection of particles comprising silicon oxide, the collection of particles having an average diameter less than 50 nm and less then 1 particle in $10^6$ with a diameter greater than about four times the average diameter.

2. The collection of particles of claim 1 wherein the collection of particles have an average diameter from about 5 nm to about 25 nm.

3. The collection of particles of claim 1 wherein the silicon oxide is amorphous.

4. The collection of particles of claim 1 wherein the collection of particles comprise less than about 0.001 percent by weight metal.

5. The collection of particles of claim 1 wherein the collection of particles comprise less then about 0.00001 percent by weight metal.

6. The collection of particles of claim 1 wherein the collection of particles includes less than 1 particle in $10^6$ with a diameter greater than about three times the average diameter.

7. The collection of particles of claim 1 wherein the collection of particles includes less than 1 particle in $10^6$ with a diameter greater than about two times the average diameter.

8. The collection of particles of claim 1 wherein the collection of particles have a distribution of particle sizes such that at least about 95 percent of the particles have a diameter greater than about 40 percent of the average diameter and less than about 160 percent of the average diameter.

9. A polishing composition comprising a dispersion of silicon oxide particles, the particles having an average diameter less than 50 nm and less than 1 particle in $10^6$ with a diameter greater than about four times the average diameter.

10. The polishing composition of claim 9 wherein the silicon oxide particles are amorphous.

11. The polishing composition of claim 9 wherein the polishing composition comprises from about 0.05 percent by weight to about 50 percent by weight silicon oxide particles.

12. The polishing composition of claim 9 wherein the polishing composition comprises from about 1.0 percent by weight to about 20 percent by weight silicon oxide particles.

13. The polishing composition of claim 9 wherein the dispersion is an aqueous dispersion.

14. The polishing composition of claim 9 wherein the dispersion is a nonaqueous dispersion.

15. The polishing composition of claim 9 further comprising abrasive particles selected from the group consisting of silicon carbide, metal oxides, metal sulfides and metal carbides.

* * * * *